United States Patent
Dodge et al.

(10) Patent No.: US 7,264,662 B2
(45) Date of Patent: *Sep. 4, 2007

(54) INK SETS FOR INK-JET INK IMAGING

(75) Inventors: Tye Dodge, Albany, OR (US); Hiang P Lauw, Corvallis, OR (US); Linda C. Uhlir-Tsang, Corvallis, OR (US); Mary E Austin, Corvallis, OR (US); Zia Rehman, Corvallis, OR (US); Matthew Thornberry, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/076,167

(22) Filed: Mar. 9, 2005

(65) Prior Publication Data

US 2006/0201381 A1 Sep. 14, 2006

(51) Int. Cl.
*C09D 11/02* (2006.01)
(52) U.S. Cl. .............. 106/31.27; 106/31.48; 106/31.49; 106/31.5; 106/31.58
(58) Field of Classification Search ............. 106/31.27, 106/31.49, 31.58, 31.48, 31.5
See application file for complete search history.

(56) References Cited

U.S. PATENT DOCUMENTS

| | | | |
|---|---|---|---|
| 5,118,350 A | 6/1992 | Prasad | |
| 6,053,969 A * | 4/2000 | Lauw et al. | 106/31.27 |
| 6,149,722 A | 11/2000 | Robertson et al. | |
| 6,521,032 B1 | 2/2003 | Lehmann et al. | |
| 6,540,821 B2 | 4/2003 | Adamic et al. | |
| 6,559,292 B1 | 5/2003 | Mistry et al. | |
| 6,569,212 B2 | 5/2003 | Carr | |
| 6,673,140 B2 * | 1/2004 | Tyrell et al. | 106/31.5 |
| 6,695,443 B2 * | 2/2004 | Arita et al. | 347/100 |
| 6,824,598 B2 * | 11/2004 | Thornberry et al. | 106/31.27 |
| 6,843,838 B2 | 1/2005 | Zimmer et al. | |
| 6,979,364 B2 * | 12/2005 | Wright et al. | 106/31.5 |
| 6,991,676 B2 * | 1/2006 | Kabalnov et al. | 106/31.48 |
| 6,997,978 B2 * | 2/2006 | Kabalnov et al. | 106/31.51 |
| 2002/0130937 A1 | 9/2002 | Hadjisoteriou et al | |
| 2003/0222959 A1 | 12/2003 | Yamanouchi et al. | |
| 2004/0074418 A1 * | 4/2004 | Mafune et al. | 106/31.27 |
| 2005/0011406 A1 | 1/2005 | Kabalnov et al. | |
| 2005/0054751 A1 * | 3/2005 | Namba et al. | 523/160 |
| 2005/0115458 A1 * | 6/2005 | Oki et al. | 106/31.47 |
| 2005/0160937 A1 * | 7/2005 | Gremaud et al. | 106/31.48 |
| 2005/0211131 A1 * | 9/2005 | Wright | 106/31.5 |

FOREIGN PATENT DOCUMENTS

| | | |
|---|---|---|
| EP | 1 048 705 A1 | 11/2000 |
| EP | 1 122 286 A | 8/2001 |
| EP | 1 213 332 A | 6/2002 |
| EP | 1 443 085 A | 8/2004 |
| WO | WO 2004/046265 | 6/2004 |

* cited by examiner

*Primary Examiner*—Helene Klemanski

(57) ABSTRACT

The present invention is drawn to ink sets ink-jet imaging, including ink sets having six ink-jet inks. In one embodiment, the ink set can comprise a black ink including a first organic solvent system, a cyan ink including a second organic solvent system, a magenta ink including a third organic solvent system, and a yellow ink including a fourth organic solvent system. In this embodiment, at least two of the organic solvent systems are different. The first organic solvent system can include a first organic solvent and a second organic solvent. The second and third organic solvent systems can include the first organic solvent and a third organic solvent. The fourth organic solvent system can include the second organic solvent and a fourth organic solvent. These solvent systems, and others, can also be used to prepare various dye sets that are dye specific.

57 Claims, No Drawings

INK SETS FOR INK-JET INK IMAGING

FIELD OF THE INVENTION

The present invention is drawn to the area of ink-jet imaging. More specifically, the present invention is drawn to ink sets configured to provide improved air fade resistance and light fastness, while maintaining high gamut volume, appropriate hue values, high chroma, and/or low bronzing.

BACKGROUND OF THE INVENTION

In general, ink-jet inks are either dye- or pigment-based inks. Both are typically prepared in an ink vehicle that contains the dye and/or the pigment. Dye-based ink-jet inks generally use a soluble colorant that is usually water-based to turn the media a specific color. Conversely, pigmented inks typically use an insoluble or dispersed colorant to achieve color.

Color characteristics of dye-containing inks play an important role in the quality of the printed ink-jet image. Perceived color quality can be characterized using any one of several color space systems, such as CIELAB, as is well known in the art. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). Additional terms such as h° (hue angle) and C* (chroma) are used to further describe a given color, as is known to those skilled in the art. A single ink-jet ink of a first color that has good chroma, gamut, hue angle, and light fastness is not always optimal for use with other colors. In other words, not only does an individual color, i.e., cyan, magenta, or yellow, have to have acceptable color qualities, but the ink set in which it is used also plays a role in whether the ink-jet ink performs in an acceptable manner. Thus, the appropriate use of certain inks together for use in an ink set can improve image quality.

Accordingly, investigations continue into developing ink sets that have improved properties and that do not improve one property at the significant expense of the others.

SUMMARY OF THE INVENTION

It has been recognized that it would be advantageous to develop ink sets which exhibit acceptable air fade resistance, gamut, light fastness, chroma, reliability, materials compatibility, jettability, etc. As such, an ink set can comprise a black ink including a first organic solvent system, a cyan ink including a second organic solvent system, a magenta ink including a third organic solvent system, and a yellow ink including a fourth organic solvent system. In this embodiment, at least two of the organic solvent systems are different from one another. The first organic solvent system can include a first organic solvent and a second organic solvent. The second and third organic solvent systems can include the first organic solvent and a third organic solvent. The fourth organic solvent system can include the second organic solvent and a fourth organic solvent.

In another embodiment, an ink set for ink-jet imaging can comprise a black ink including a dye having the structure of Formula I, as follows:

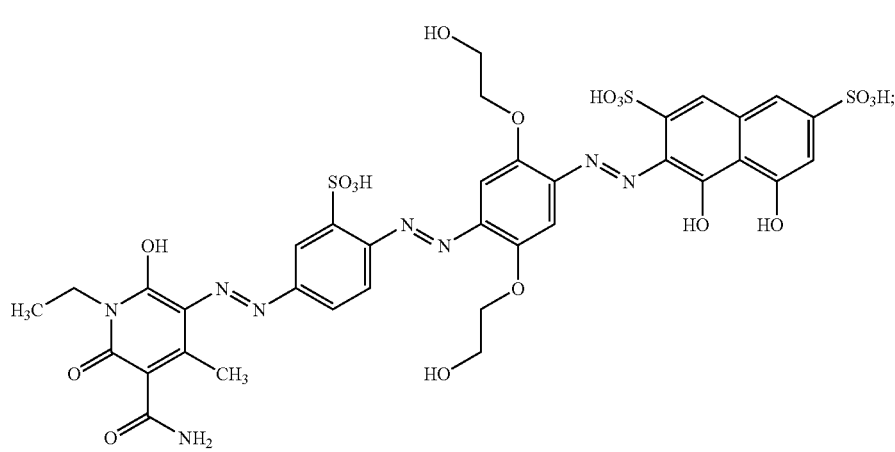

and at least one colored ink including a cyan dye, magenta dye, or yellow dye of Formulas II, III, or IV, respectively. Dye Formula II is as follows:

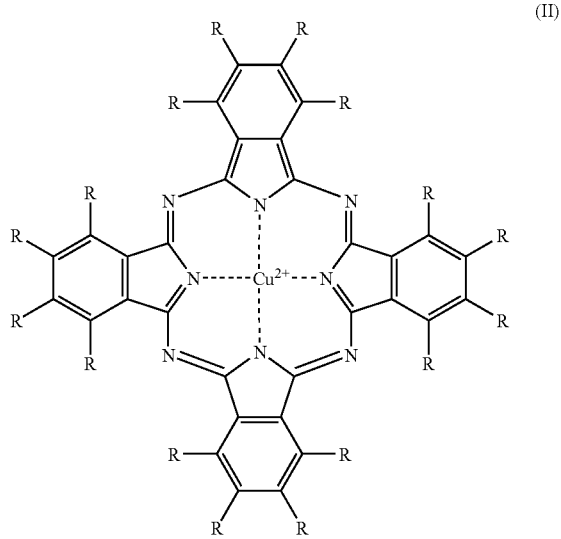

wherein each R group is independently selected from the group consisting of H, $SO_3H$, $SO_2NH_2$, and $SO_2NH$-alkyl-OH, with the proviso that an average of from 2 to 6 R groups are other than H. Dye Formula III is the $Ni^{2+}$ complex of the following structure:

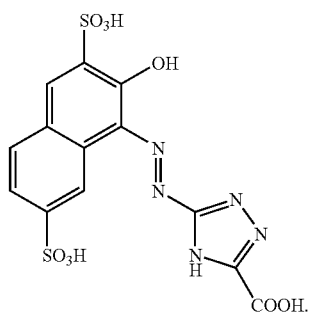

(III)

Dye Formula IV is as follows:

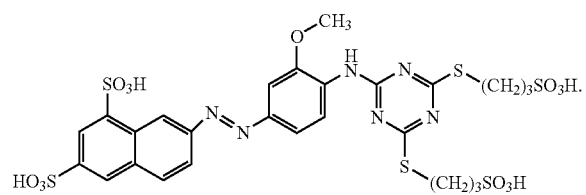

(IV)

In another embodiment, an ink set for ink-jet imaging can comprise a cyan ink including a first cyan dye and a pale cyan ink including a second cyan dye. The first cyan dye and the second cyan dye can each have the same general chemical formula:

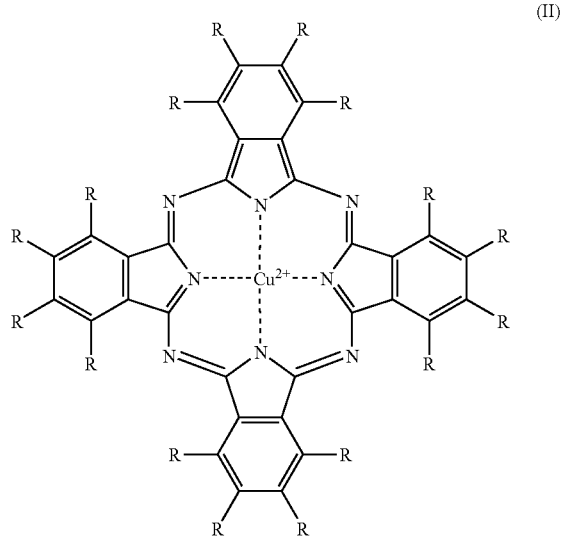

(II)

wherein each R group is independently selected from the group consisting of H, $SO_3H$, $SO_2NH_2$, and $SO_2NH$-alkyl-OH, with the proviso that an average of from 2 to 6 R groups are other than H. However, the first cyan dye can have an average of 0.25 to less than 1.5 of the $SO_2NH$-alkyl-OH groups, and the second cyan dye can have an average of 1.5 to 3 of $SO_2NH$-alkyl-OH groups.

In still another embodiment, an ink set for ink-jet imaging can comprise a magenta ink including a first magenta dye and a second magenta dye, wherein the first magenta dye is more chromatic than the second magenta dye, and wherein the second magenta dye provides more image permanence than the first magenta dye. The ink set can further include a pale magenta ink including the second magenta dye and not the first magenta dye.

Additional features and advantages of the invention will be apparent from the detailed description which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc.

The term "organic solvent system" refers to organic solvents present in the liquid vehicle in higher than nominal amounts, e.g., at least 2 wt %. Surfactants, biocides, chelating agents, salts, etc., though typically also present in the liquid vehicle, are not considered to be part of the solvent system.

The term "metallized dye" includes dyes that have a transition metal that is chelated, coordinated, or complexed to the dye molecule as an integral part of the dye structure. Metallized dyes do not include dyes that merely include a metal counter ion. For example, DB199Na is a copper phthalocyanine dye having a sodium counter ion. The copper component makes this particular dye a "metallized" dye, whereas the sodium counter ion does not.

Likewise, the term "non-metallized dye" refers to dyes that do not include a transition metal that is chelated, coordinated, or complexed to the dye molecule. Thus, AR52Na is a sodium salt of Acid Red 52, but is not considered to be metallized in accordance with embodiments of the present invention.

When referring to pale cyan inks and pale magenta inks, the term "pale" is a relative term, where the ink is compared to its non-pale counterpart. For example, a pale magenta would have a higher L* value than a magenta ink it is compared with. Likewise, a pale cyan ink would also have a higher L* value than the cyan ink it is compared with. Other values of the L*a*b* color space can optionally also be different, though not required.

The term "about" when referring to a numerical value or range is intended to encompass the values resulting from experimental error that can occur when taking measurements.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

With this in mind, the present invention is drawn to the area of ink-jet imaging. More specifically, the present invention is drawn to dye-based ink sets for use with ink-jet printers. These ink sets typically include from three to eight inks, and each ink can include one or more dyes. Each of the dyes used in the ink sets are described herein individually, though it is understood that these dyes are presented herein primarily in the context of their presence in ink-jet inks, and in the context of their respective ink sets. Further, when referring to an ink or a specific ink-jet ink, dyes are understood to be admixed within a liquid vehicle to form the respective ink. To prepare the ink sets, individual dyes or dye blends of a dye set can be included in one or multiple types of liquid vehicles. In other words, each dye or dye blend of the dye set can be present in the same or similar type of liquid vehicle, or each dye or dye pair can be present in a distinct liquid vehicle that has a unique formulation.

Generally, the ink sets described herein can include individual dyes that provide long term ink-jet ink reliability. Because of the effective reliability of certain dyes in certain liquid vehicles in accordance with embodiments of the present invention, these inks are suitable for use in off-axis printers. As off-axis printers have a permanent ink-jet printhead and only the ink supply is replaced, there is a need to provide long term printhead reliability. Thus, the selection of dyes and associated liquid vehicles can be significant in achieving this goal. Further, it is also desirable to provide inks that can be used to print more robust images that are resistant to both air fade and light fade. The ink sets of the present invention provide a good balance between good photo image quality on specialty photo papers, e.g., swellable and inorganic porous media, as well as good image quality when printed on plain paper.

In accordance with this, in one embodiment, an ink set can comprise a black ink including a first organic solvent system, a cyan ink including a second organic solvent system, a magenta ink including a third organic solvent system, and a yellow ink including a fourth organic solvent system. In this embodiment, at least two of the organic solvent systems are different. The first organic solvent system can include a first organic solvent and a second organic solvent. The second and third organic solvent systems can include the first organic solvent and a third organic solvent. The fourth organic solvent system can include the second organic solvent and a fourth organic solvent.

In further detailed aspects of the present invention, the black ink does not include at least one of the third organic solvent and the fourth organic solvent. Alternatively or additionally, at least one of the cyan ink and the magenta ink does not include at least one of the second organic solvent and the fourth organic solvent. Further, in another embodiment, the yellow ink does not include at least one of the first organic solvent and the third organic solvent. With respect to the solvent systems that are different from one another, any two of the inks can have different solvent systems. For example, the solvent system of the yellow ink can be different than the solvent system of the cyan ink or the magenta ink. Alternatively, the solvent system of the black ink can be different than the solvent system of the cyan ink, the magenta ink, or the yellow ink. Still further, all of the solvent systems can be different from one another, or all can be different except for the cyan ink(s) and the magenta ink(s).

In another aspect of the present invention, the ink set can have additional inks other than cyan, magenta, yellow, and black. For example, other colors can be selected for use, or variations of these colors can be prepared. Thus, in one embodiment, the ink set can further comprise a pale cyan ink and/or a pale magenta ink. In this embodiment, for simplicity, each of these inks can include at least one of the first organic solvent and the third organic solvent. These solvent systems are useful in non-reactive ink systems, i.e. systems where the black ink, the cyan ink, the magenta ink, and the yellow ink are non-reactive with one another.

In accordance with one specific embodiment of the present invention, the first organic solvent can be 1-(2-hydroxyethyl)-2-pyrrolidinone, the second organic solvent can be 2-pyrrolidinone, the third organic solvent can be 2-methyl-1,3-propanediol, and/or the fourth organic solvent can be selected from the group consisting of tetraethylene glycol, ethylhydroxypropanediol, and mixtures thereof. These solvents can also be rearranged with respect their presence within the three or four (or more) inks of the ink set.

In certain embodiments, certain ink sets are also effective for use with certain specific dyes alone. Thus, it is understood that certain specific dyes described herein can be utilized with the ink set described in this embodiment, though the use of these dyes is not required.

In another embodiment, an ink set for ink-jet imaging can comprise a black ink including a black dye having structure of Formula I, as follow:

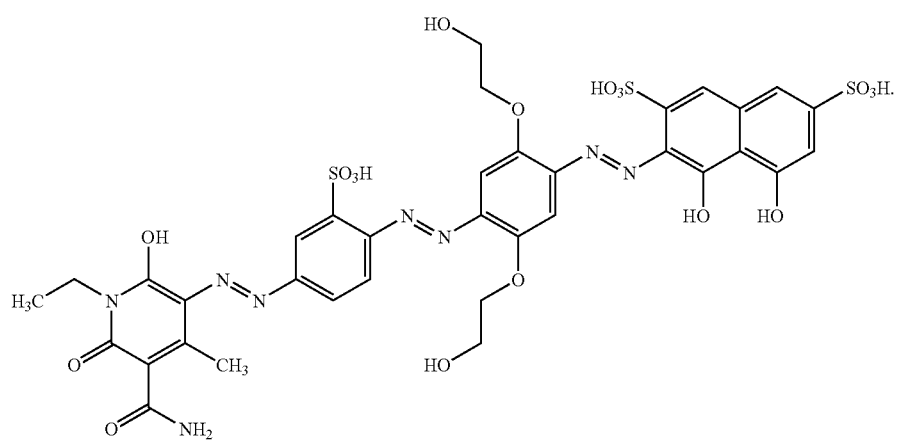

(I)

This ink set can also include at least one colored ink including a cyan dye, a magenta dye, or a yellow dye of Formulas II, III, or IV, respectively. The cyan dye can have the structure of Formula II, as follows:

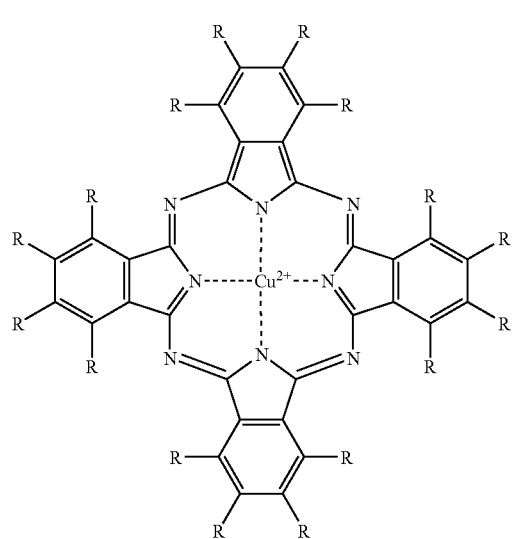

(II)

wherein each R group is independently selected from the group consisting of H, $SO_3H$, $SO_2NH_2$, and $SO_2NH$-alkyl-OH, with the proviso that an average of from 2 to 6 R groups are other than H. In this particular embodiment, there is no particular limitation placed on how many average $SO_3H$, $SO_2NH_2$, or $SO_2NH$-alkyl-OH groups are present, provided the average of all groups is from 2 to 6. The magenta dye can be a $Ni^{2+}$ complex of the structure of Formula III, as follows:

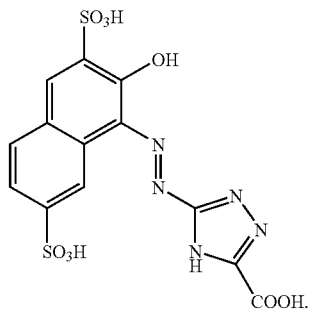

(III)

The yellow dye can have the structure of Formula IV, as follows:

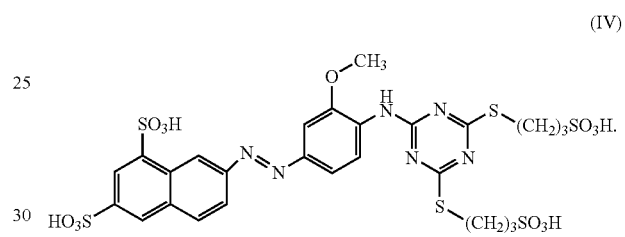

(IV)

In this embodiment, and other embodiments that utilize the black dye represented by Formula I above, it is notable that this black dye is beneficial for use in full color dye sets, and also, provides excellent black text printing capabilities. Further, this black dye has excellent optical density on plain paper and photo media, such as inorganic porous-coated media and swellable media, and can be formulated in certain liquid vehicles to provide laser-quality black text. In this embodiment, there are also variations that can be practiced in accordance with embodiments of the present invention. For example, though the ink set only requires two inks, the ink set can include three inks, four inks, five inks, six inks, etc. In ink sets including six inks, the individual inks can be the black ink, a cyan ink, a pale cyan ink, a magenta ink, a pale magenta ink, and a yellow ink, where one of these colored inks includes a dye of Formulas II-IV.

In other embodiments, the magenta ink and the pale magenta ink, and/or the cyan ink and the pale cyan ink, can have different L*, a*, and b* coordinates. The cyan ink and the pale cyan, and/or the magenta ink and the pale magenta ink, can also be prepared using different dyes. The different dyes can be used to obtain different color space values for one, two, or all three of the L*a*b* coordinates.

In another embodiment, an ink set for inkjet imaging can comprise a cyan ink including a first cyan dye and a pale cyan ink including a second cyan dye. The first cyan dye and the second cyan dye can each have the same general chemical formula:

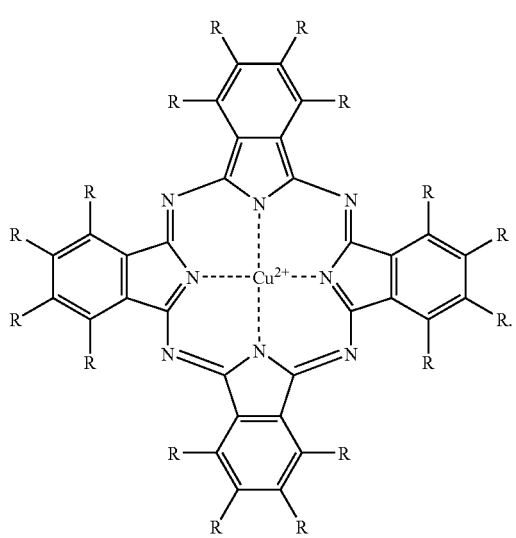

In Formula II above, the dye includes a copper (II) phthalocyanine core. With respect to both the first cyan dye and the second cyan dye, it is the R group selection that defines the difference between the two specific dyes disclosed herein. With respect to both dyes, each R group is independently selected from the group consisting of H, $SO_3H$, $SO_2NH_2$, and $SO_2NH$-alkyl-OH, with the proviso that an average of from 2 to 6 R groups are other than H. However, with respect to the first cyan dye, there is an average of 0.25 to less than 1.5 of the $SO_2NH$-alkyl-OH groups, and with respect to the second cyan dye, there is an average of 1.5 to 3 of the $SO_2NH$-alkyl-OH groups. It is notable that with respect to this particular embodiment where the ink set includes two different cyan dyes of the same general chemical formula, unlike the previous embodiment that more generally utilizes the dye of Formula II, the $SO_2NH$-alkyl-OH group for each of the first cyan dye and the second cyan dye is present at an average range that does not overlap. By "alkyl" what is meant is lower alkyl having from 1 to 4 carbon atoms.

With more detail regarding the first cyan dye, in one embodiment, pendent to the phthalocyanine core, there can be an average of from 1 to 4 $SO_3H$ groups functionalized on the dye, an average of from 0.25 to 2 $SO_2NH_2$ groups functionalized on the dye, and an average of from 0.25 to less than 1.5 $SO_2NH$-alkyl-OH groups functionalized on the dye. In one embodiment, an average of about four total R groups other than H can be present. To cite one specific dye that is useful for use as the first cyan dye, pendent to the phthalocyanine core, there can be an average of about 1.8 $SO_3H$ groups functionalized on the dye, an average of about 1 $SO_2NH_2$ groups functionalized on the dye, and/or an average about 1.2 $SO_2NH$-alkyl-OH groups functionalized on the dye. In this specific example, the alkyl group of the $SO_2NH$-alkyl-OH group can be ethyl.

With more detail regarding the second cyan dye, in one embodiment, pendent to the phthalocyanine core, there can be an average of from 0.25 to 2 $SO_3H$ groups functionalized on the dye, an average of from 0.25 to 2.5 $SO_2NH_2$ groups functionalized on the dye, and an average of from 1.5 to 3 $SO_2NH$-alkyl-OH groups functionalized on the phthalocyanine dye core. In one embodiment, an average of about four total R groups other than H can be present. To cite one specific dye that is useful for use as the first cyan dye, pendent to the phthalocyanine core, there can be an average of about 1 $SO_3H$ groups functionalized on the dye, an average of about 1.2 $SO_2NH_2$ groups functionalized on the dye, and/or an average about 1.8 $SO_2NH$-alkyl-OH groups functionalized on the dye. In this specific example, the alkyl group of the $SO_2NH$-alkyl-OH group can be ethyl.

In each of the above embodiments, an emphasis is placed on average numbers of pendent groups attached to each phthalocyanine core. By "average," what is meant is that the totality of any given pendent group in a dye lot or batch will yield a value within the stated average numerical range. For example, a pendent group range of 0.5 to 1 means that some molecules of a dye batch can be void of that pendent group, and others can contain 1 or more of that pendent group. Thus, one dye batch can have a 0.5 average value, and another dye batch can have a 1 average value, and both batches would be within the recited range. It is notable that with respect to the $SO_2NH$-alkyl-OH group for the first cyan dye and the second cyan dye, the average ranges are not overlapping in this specific dye set embodiment.

The cyan dye(s) of Formula II, when included in an ink-jet ink, provide excellent air fade and light fade resistance, while minimizing bronzing. Bronzing is the metallic sheen that can occur on any printed region of an ink-jet produced print, but particularly occurs in black, cyan, and/or blue print areas. Further, this dye is effective for use on swellable media, inorganic porous media, plain paper, and other substrates. Achieving both air fade resistance and bronzing resistance at this time is difficult. In general, more fade resistant dye molecules tend to bronze more heavily. It has been discovered that the ratio of functional groups, i.e. R groups, as well as the dye load, can affect bronzing. Thus, carefully selecting these parameters can improve image quality and longevity.

This embodiment can also include the same variations as the other embodiments described herein. However, in this embodiment in particular, the concentration of the first cyan dye in the first cyan ink can be from 1 wt % to 6 wt %, and/or the concentration of the second cyan dye in the second cyan ink is from 0.5 wt % to 4 wt %. Again, this ink set can further include a black ink, a magenta ink, a pale magenta ink, and a yellow ink, making an ink set having six inks.

In still another embodiment, an ink set for ink-jet imaging can comprise a magenta ink including a first magenta dye and a second magenta dye, wherein the first magenta dye is more chromatic than the second magenta dye, and wherein the second magenta dye provides more image permanence than the first magenta dye. The ink set can further include a pale magenta ink including the second magenta dye and not the first magenta dye.

In another detailed aspect, the ink set can comprise a pair of magenta dyes for formulating a magenta ink and a pale magenta ink. In this embodiment, both dyes of the pair of magenta dyes are used to formulate the magenta ink-jet ink, and only one dye of the pair of magenta dyes is used to formulate the pale magenta ink. In one embodiment, the pair of magenta dyes can include a transition metal-containing azo dye, e.g., $Ni^{2+}$ complex of the Formula III dye as shown below:

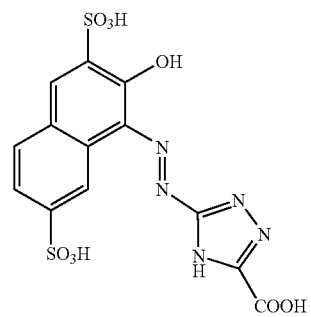

and/or a non-metallized dye, e.g., AR52Na.

By coordinating the dye choice for the magenta ink and the pale magenta ink, these two inks can be formulated to have different L*, a*, and b* coordinates. In one specific embodiment, the first magenta dye can be a more chromatic dye of the non-metallized xanthene family of dyes. One example of such dye is Acid Red 52. The second magenta dye can be a transition metal-containing azo dye, such as the dye of Formula III. With these dyes and other magenta dyes, the concentration of the first magenta dye in the first magenta ink can be from 0.1 wt % to 5 wt %, or alternatively, from 0.2 wt % to 1 wt %, the concentration of the second magenta dye in the first magenta ink can be from 1 wt % to 6 wt %, and the concentration of the second magenta dye in the pale magenta ink can be from 0.5 wt % to 4 wt %.

To obtain excellent color, typically, bright dyes can be selected for use in a magenta ink-jet ink. However, bright dyes often have poor light fastness. In accordance with one exemplary embodiment related to the magenta ink set described herein, this problem can be solved by carefully blending the dye of Formula III with a second type of dye, such as a non-metallized xanthene dye. For example, AR52 (xanthene), which is a very bright dye, can be used to provide vivid color to a magenta ink, and the Formula III dye can be used to provide improved image permanence. With respect to pale magenta inks, as bright or vivid color is not as necessary, pale magenta ink-jet inks can be formulated using only the dye of Formula III, for example.

The dye sets of the present invention also typically include a yellow dye.

The yellow dye, in one embodiment, can have the structure shown in Formula IV, as follows:

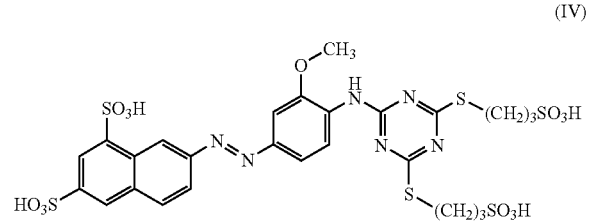

(IV)

As described, the ink sets of the present invention can be in the form of sets of three inks, four inks, five inks, six inks, etc. More specifically, ink sets containing two, three, four, five, or six ink sets are common in the industry and the cyan-magenta-yellow-black ink sets described herein could be incorporated into such a system as is known in the art.

The ink sets of the present invention can be formulated with various dye concentrations which can vary depending on the type of ink that is to be formulated. For example, a heavier dye load (higher dye concentration) can be present in the cyan and magenta inks compared to the pale cyan and pale magenta inks, respectively. More general ranges than those recited previously can be used, depending on the specific dyes and/or vehicle components selected. Generally, for most cyan and magenta inks, the dye concentration, for example, can be from about 0.1 wt % to about 10 wt %. For the pale cyan and the pale magenta inks, the dye concentration can be from about 0.1 wt % to about 6 wt %. With respect to the black ink-jet ink, the black dye concentration can be from about 0.1 wt % to about 10 wt %, and with respect to the yellow ink-jet ink, the yellow dye concentration can be from about 0.1 wt % to about 10 wt %.

The ink sets of the present invention can be used with commercially available ink-jet printers, such as DESK-JET™ or PHOTOSMART™ and other similar printers manufactured by Hewlett-Packard Company. It is notable that these inks are acceptable for use with both thermal ink-jet ink printers and piezo ink-jet printers. They can also be used with off-axis printers, which have a high demand with respect to maintaining a reliable ink with low incidences of clogging. Further, these ink sets can produce true colors on a variety of media, including uncoated media, clay coated media, inorganic porous coated media, e.g., silica- and alumina-based media, and organic swellable media, e.g., gelatin coated media, each with improved light fastness, gamut, and other print quality enhancements.

As mentioned, in some embodiment of the present invention, each color or black of the ink set, namely black, cyan, magenta, and yellow (and optionally, pale cyan and pale magenta), can include from one to multiple dyes in a single ink, each having more than one dye load. That is, there can be one or more ink-jet reservoir(s) filled for each ink color, each reservoir having an ink therein which can have a different dye load, a different dye, different vehicle components, different amounts of vehicle components, etc. For example, there can be two magenta reservoirs, each containing inks with a different dye load and/or a different magenta dye.

A typical liquid vehicle formulation that can be used with a dye set of the present invention can include one or more organic co-solvent(s), present in total at from 5.0% to 50.0% by weight, and one or more non-ionic, cationic, and/or anionic surfactant(s), present from 0.01% to 10.0% by weight. The balance of the formulation can be purified water, or other vehicle components known in the art such as biocides, viscosity modifiers, pH adjusting agents, sequestering agents, preservatives, anti-kogation agents, bleed control agents, drying agents, jettability agents, and the like.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include 2-pyrrolidinone, derivatized 2-pyrrolidinone including 1-(2-hydroxyethyl)-2-pyrrolidinone, 2-methyl-1,3-propanediol, tetraethylene glycol, and ethylhydroxypropanediol (EHPD), to name a few.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Specific examples of preferred surfactants for use include SOLSPERSE, TERGITOL, DOWFAX, and the like. The amount of surfactant added to the formulation of this invention may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other anti-microbial agents, which are routinely used in ink formulations. Examples of suitable microbial agents include, but are not limited to, NUOSEPT, UCARCIDE, VANCIDE, PROXEL, and combinations thereof.

Sequestering agents, such as EDTA (ethylenediaminetetraacetic acid), may be included to eliminate the deleterious effects of metal impurities. Such sequestering agents typically comprise from 0 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethyl-ethanolamine; hydrochloric acid; and other basic or acidic components. If used, pH adjusting agents typically comprise less than about 10 wt % of the ink-jet ink composition. Similarly, buffering agents can be used such as, but not limited to, TRIS, MOPS, citric acid, acetic acid, MES, etc. If used, buffering agents typically comprise less than about 3 wt % of the ink-jet ink composition and generally from about 0.01 wt % to 2 wt %, most commonly from 0.2 wt % to 0.5 wt %. Additionally, anti-kogation agents that can be used include lithium phosphate, sodium phosphate, phosphate esters of fatty alcohol alkoxylates, and the like, in amounts from about 0.01 wt % to 5 wt %.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Ink Set

An ink set with six inks can be prepared in accordance with Tables 1-6, or alternatively, an ink set with four inks can be prepared in accordance with Tables 1-4.

TABLE 1

Black Ink

| Component | Amount |
| --- | --- |
| 1-(2-hydroxyethyl)-2-pyrrolidinone | 5–20 wt % |
| 2-pyrrolidinone | 5–20 wt % |
| Solsperse surfactant (Avecia) | 0.25 wt % |
| Li-phosphate | 0.1 wt % |
| Ethylenediaminetetraacetic acid (disodium salt) | 0.1 wt % |
| 4-morpholine propane sulfonic acid (free acid) | 0.2 wt % |
| Proxel GXL (Avecia) | 0.1 wt % |
| Formula I dye | 2–5 wt % |
| Target pH | 7–7.5 |

TABLE 2

Cyan Ink

| Component | Amount |
| --- | --- |
| 1-(2-hydroxyethyl)-2-pyrrolidinone | 5–20 wt % |
| 2-methyl-1,3-propanediol | 5–9.8 wt % |
| Ethoxylated surfactant | 0.75–3.25 wt % |
| Anionic alkyldiphenyloxide disulfonate | 0.3–9 wt % |
| Sodium phosphate dodecahydrate | 0.167 wt % |
| Ethylenediaminetetraacetic acid (disodium salt) | 0.1 wt % |
| Tris(hydroxymethyl)aminomethane | 0.2 wt % |
| Proxel GXL (Avecia) | 0.1 wt % |
| Formula II dye[1] | 1–5 wt % |
| Target pH | 8–8.5 |

[1]Average of 1.2 $SO_2NHCH_2CH_2OH$ groups

TABLE 3

Magenta Ink

| Components | Amount |
| --- | --- |
| 1-(2-hydroxyethyl)-2-pyrrolidinone | 5–20 wt % |
| 2-methyl-1,3-propanediol | 5–9.8 wt % |
| Ethoxylated surfactant | 0.75–3.25 wt % |
| Anionic alkyldiphenyloxide disulfonate | 0.3–9 wt % |
| Ethylenediaminetetraacetic acid (disodium salt) | 0.75 wt % |
| Tris(hydroxymethyl)aminomethane | 0.2 wt % |
| Proxel GXL (Avecia) | 0.1 wt % |
| Formula III dye | 1–5 wt % |
| AR52-Na dye | 0.2–1 wt % |
| Target pH | 8–8.5 |

TABLE 4

Yellow Ink

| Components | Amount |
| --- | --- |
| 2-pyrrolidinone | 5–10 wt % |
| Tetraethylene glycol | 3–9 wt % |
| Ethylhydroxypropanediol (EHPD) | 3–9 wt % |
| Ethoxylated surfactant | 0.75–3.25 wt % |
| Anionic alkyldiphenyloxide disulfonate | 0.3–9 wt % |
| Ethylenediaminetetraacetic acid (disodium salt) | 0.1 wt % |
| 4-morpholine propane sulfonic acid (free acid) | 0.2 wt % |
| Proxel GXL (Avecia) | 0.1 wt % |
| Formula IV dye | 2–5 wt % |
| Target pH | 7–7.5 |

TABLE 5

Pale Cyan Ink

| Component | Amount |
| --- | --- |
| 1-(2-hydroxyethyl)-2-pyrrolidinone | 5–20 wt % |
| 2-methyl-1,3-propanediol | 5–9.8 wt % |
| Ethoxylated surfactant | 0.75–3.25 wt % |
| Anionic alkyldiphenyloxide disulfonate | 0.3–9 wt % |
| Phosphate ester of fatty alcohol alkoxylate | 0.4 wt % |
| Ethylenediaminetetraacetic acid (disodium salt) | 0.1 wt % |
| Tris(hydroxymethyl)aminomethane | 0.2 wt % |
| Proxel GXL (Avecia) | 0.1 wt % |
| Formula II dye[2] | 0.5–4 wt % |
| Target pH | 8–8.5 |

[2]Average of 1.8 $SO_2NHCH_2CH_2OH$ groups

TABLE 6

Pale Magenta Ink

| Component | Amount |
| --- | --- |
| 1-(2-hydroxyethyl)-2-pyrrolidinone | 5–20 wt % |
| 2-methyl-1,3-propanediol | 5–9.8 wt % |
| Ethoxylated surfactant | 0.75–3.25 wt % |
| Anionic alkyldiphenyloxide disulfonate | 0.3–9 wt % |
| Tris(hydroxymethyl)aminomethane | 0.2 wt % |
| Proxel GXL (Avecia) | 0.1 wt % |
| Formula III dye | 0.5–4 wt % |
| Target pH | 8–8.5 |

While the invention has been described with reference to certain preferred embodiments, those skilled in the art will appreciate that various modifications, changes, omissions, and substitutions can be made without departing from the spirit of the invention. For example, though specific vehicles are shown for use in Example 1, other vehicles can also be used. It is intended, therefore, that the invention be limited only by the scope of the following claims.

The invention claimed is:

1. An ink set for ink-jet imaging, comprising:
   (a) a black ink including a first organic solvent system, said first organic solvent system including a first organic solvent and a second organic solvent;
   (b) a cyan ink including a second organic solvent system, said second organic solvent system including the first organic solvent and a third organic solvent;
   (c) a magenta ink including a third organic solvent system, said third organic solvent system including the first organic solvent and the third organic solvent; and
   (d) a yellow ink including a fourth organic solvent system, said fourth organic solvent system including the second organic solvent and a fourth organic solvent,
   wherein the black ink does not include at least one of the third organic solvent and the fourth organic solvent, at least one of the cyan ink and the magenta ink does not include at least one of the second organic solvent and the fourth organic solvent, and the yellow ink does not include at least one of the first organic solvent and the third organic solvent.

2. An ink set as in claim 1, wherein the solvent system of the yellow ink is different than the solvent system of the cyan ink or the magenta ink.

3. An ink set as in claim 1, wherein the solvent system of the black ink is different than the solvent system of the cyan ink, the magenta ink, or the yellow ink.

4. An ink set as in claim 1, further comprising a pale cyan ink and a pale magenta ink, each including at least one of the first organic solvent and the third organic solvent.

5. An ink set as in claim 1, wherein the first organic solvent is 1-(2-hydroxyethyl)-2-pyrrolidinone, and is present in at least one of the black ink, the cyan ink, and the magenta ink at an amount from 5 wt % to 20 wt %.

6. An ink set as in claim 1, wherein the second organic solvent is 2-pyrrolidinone, and is present in at least one of the black ink and the yellow ink at an amount from 5 wt % to 20 wt %.

7. An ink set as in claim 1, wherein the third organic solvent is 2-methyl-1,3-propanediol, and is present in at least one of the cyan ink and the magenta ink at an amount from 5 wt % to 9.8 wt %.

8. An ink set as in claim 1, wherein the fourth organic solvent is selected from the group consisting of tetraethylene glycol, ethylhydroxypropanediol, and mixtures thereof, and wherein one or both of the tetraethylene glycol and the ethylhydroxypropanediol are individually present in the yellow ink at from 3 wt % to 9 wt %.

9. An ink set as in claim 8, wherein both the tetraethylene glycol and the ethylhydroxypropanediol are present in the yellow ink.

10. An ink set as in claim 1, wherein the black ink, the cyan ink, the magenta ink, and the yellow ink are non reactive with one another.

11. An ink set as in claim 1, wherein all of the solvent systems have at least one solvent, or derivative thereof, in common with all of the other solvent systems.

12. An ink set as in claim 1, wherein the black ink includes a black dye having the structure:

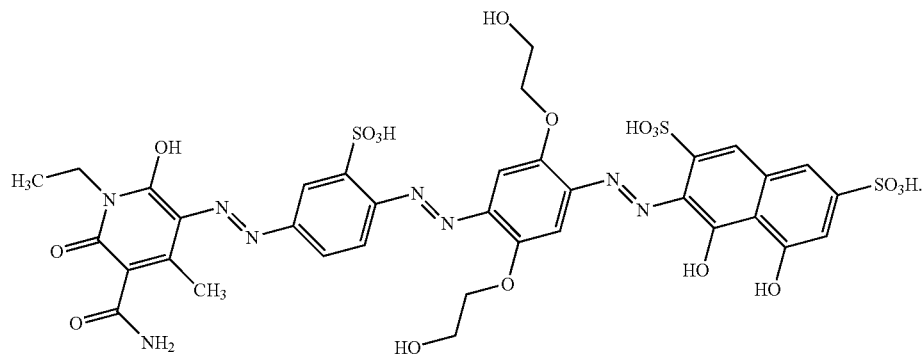

13. An ink set as in claim 1, wherein the cyan ink includes a cyan dye having the structure:

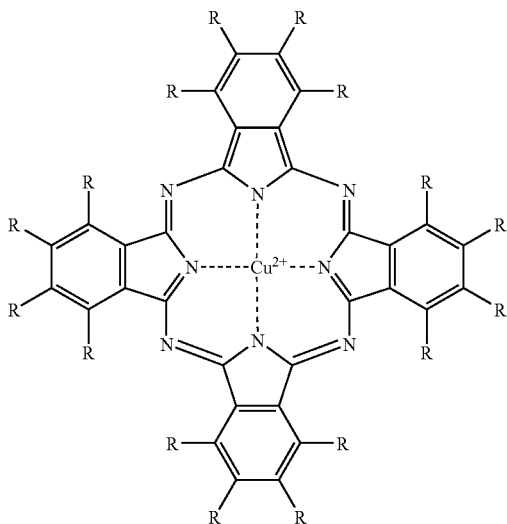

wherein each R group is independently selected from the group consisting of H, $SO_3H$, $SO_2NH_2$, and $SO_2NH$-alkyl-OH, with the proviso that an average of from 2 to 6 R groups are other than H.

14. An ink set as in claim 4, wherein the cyan ink and the pale cyan ink include a first cyan dye and a second cyan dye, respectively, each having the same general chemical formula:

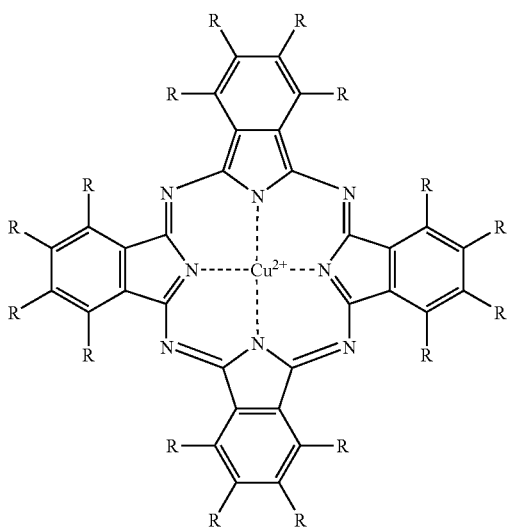

wherein each R group is independently selected from the group consisting of H, $SO_3H$, $SO_2NH_2$, and $SO_2NH$-alkyl-OH, with the proviso that an average of from 2 to 6 R groups are other than H, said first cyan dye having an average of 0.25 to less than 1.5 of the $SO_2NH$-alkyl-OH groups, and said second cyan dye having an average of 1.5 to 3 of $SO_2NH$-alkyl-OH groups.

15. An ink set as in claim 1, wherein the magenta ink includes a $Ni^{2+}$ complex of a magenta dye having the structure:

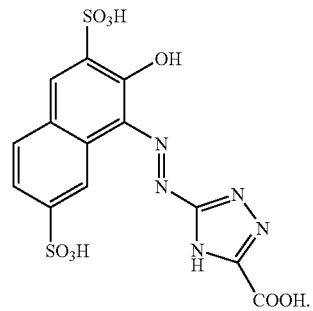

16. An ink set as in claim 15, wherein the magenta ink also includes a non-metallized dye.

17. An ink set as in claim 4, wherein the pale magenta ink includes a $Ni^{2+}$ complex of a magenta dye having the structure:

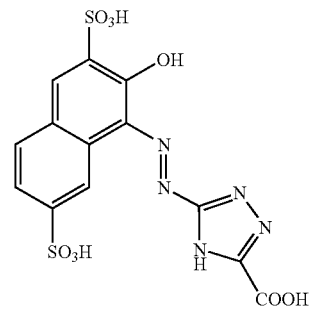

18. An ink set as in claim 1, wherein the yellow ink includes a yellow dye having the structure:

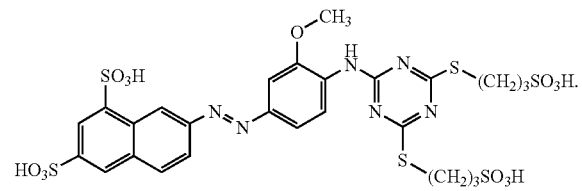

19. An ink set as in claim 1, wherein the black ink, the cyan ink, the magenta ink, and the yellow ink are all dye-based ink-jet inks.

20. An ink set for ink-jet imaging, comprising:
(a) a black ink including a black dye having Formula I:

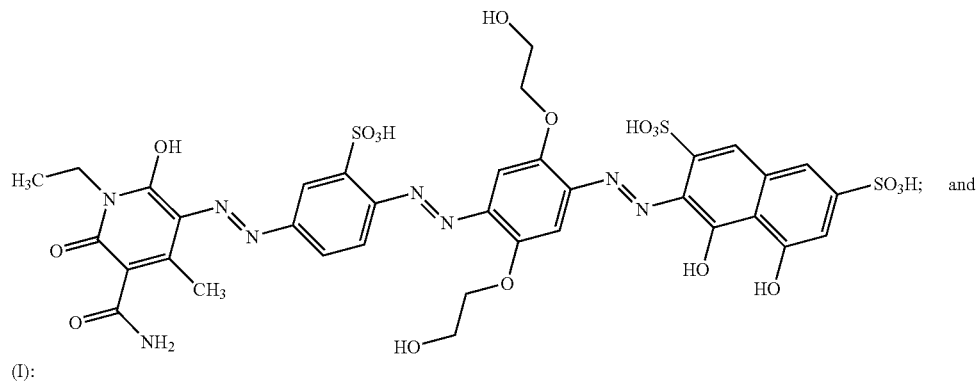

(I):

and (b) at least one colored ink including a cyan dye, a magenta dye, or a yellow dye of Formulas II, III, or IV, respectively, wherein Formulas II, III, and IV are defined as follows:

(II):

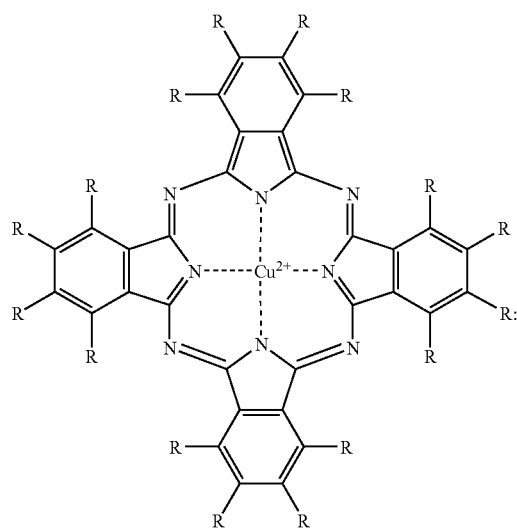

wherein each R group is independently selected from the group consisting of H, SO$_3$H, SO$_2$NH$_2$, and SO$_2$NH-alkyl-OH, with the proviso that an average of from 2 to 6 R groups are other than H;

(III): a Ni$^{2+}$ complex of:

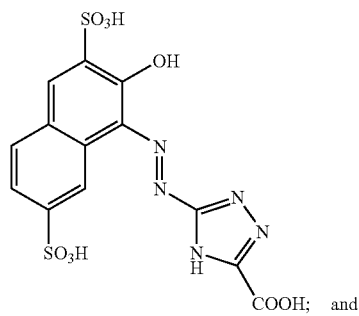

-continued (IV):

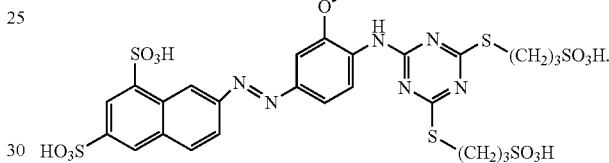

21. An ink set as in claim 20, comprising a cyan ink including the dye of Formula II, a magenta ink including the dye of Formula II, and a yellow ink including the dye of Formula IV.

22. An ink set as in claim 20, comprising the black ink, a cyan ink, a pale cyan ink, a magenta ink, a pale magenta ink, and a yellow ink.

23. An ink set as in claim 22, wherein the magenta ink and the pale magenta ink have different L*, a*, and b* coordinates.

24. An ink set as in claim 22, wherein the cyan ink and the pale cyan ink have different L*, a*, and b* coordinates.

25. An ink set as in claim 22, wherein cyan ink and the pale cyan ink are prepared using different dyes.

26. An ink set as in claim 22, wherein the magenta ink and the pale magenta ink are prepared using different dyes.

27. An ink set as in claim 20, wherein the black dye is present in the black ink-jet ink at from 2 wt % to 10 wt %.

28. An ink set as in claim 20, wherein the colored ink is the cyan ink, and the cyan dye of Formula II is present in the cyan ink at from 1 wt % to 10 wt %.

29. An ink set as in claim 20, wherein the colored ink is the magenta ink, and the magenta dye of Formula III is present in the magenta ink at from 1 wt % to 10 wt %.

30. An ink set as in claim 20, wherein the colored ink is the yellow ink, and the yellow dye of Formula IV is present in the yellow ink at from 2 wt % to 10 wt %.

31. An ink set for ink-jet imaging, comprising:
(a) a cyan ink including a first cyan dye; and (b) a pale cyan ink including a second cyan dye, said first cyan dye and said second cyan dye each having the same general chemical formula:

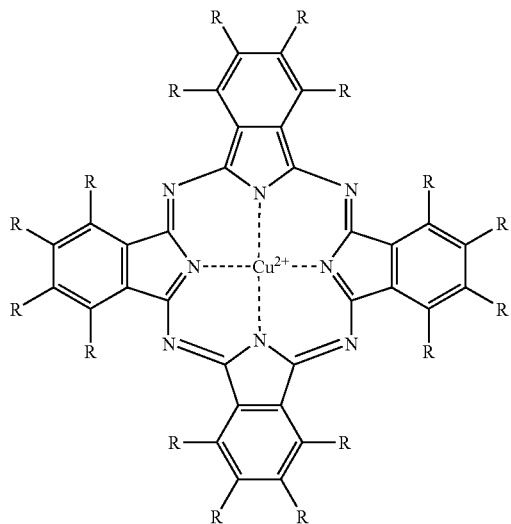

wherein each R group is independently selected from the group consisting of H, $SO_3H$, $SO_2NH_2$, and $SO_2NH$-alkyl-OH, with the proviso that an average of from 2 to 6 R groups are other than H, said first cyan dye having an average of 0.25 to less than 1.5 of the $SO_2NH$-alkyl-OH groups, and said second cyan dye having an average of 1.5 to 3 of $SO_2NH$-alkyl-OH groups.

32. An ink set as in claim 31, wherein the concentration of the first cyan dye in the first cyan ink is from 1 wt % to 6 wt %.

33. An ink set as in claim 31, wherein the concentration of the second cyan dye in the second cyan ink is from 0.5 wt % to 4 wt %.

34. An ink set as in claim 31, wherein ink set further includes a black ink, a magenta ink, a pale magenta ink, and a yellow ink.

35. An ink set for ink-jet imaging, comprising:
(a) a magenta ink including a first magenta dye and a second magenta dye, wherein the first magenta dye is more chromatic than the second magenta dye, and wherein the second magenta dye provides more image permanence than the first magenta dye; and
(b) a pale magenta ink including the second magenta dye and not the first magenta dye;
wherein at least one of the first or second magenta dyes is a transition metal-containing azo dye.

36. An ink set as in claim 35, wherein the magenta ink and the pale magenta ink have different L*, a*, and b* coordinates.

37. An ink set as in claim 35, wherein the transition metal is nickel, and wherein the transition metal-containing azo dye is a $Ni^{2+}$ complex of the structure:

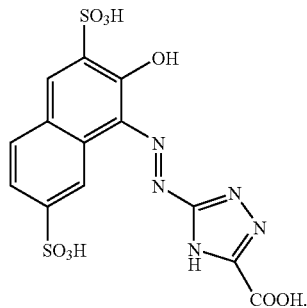

38. An ink set as in claim 35, wherein the concentration of the first magenta dye in the first magenta ink is from 0.1 wt % to 5 wt %.

39. An ink set as in claim 35, wherein the concentration of the second magenta dye in the first magenta ink is from 1 wt % to 6 wt %.

40. An ink set as in claim 35, wherein the concentration of the second magenta dye in the pale magenta ink is from 0.5 wt % to 4 wt %.

41. An ink set as in claim 35, wherein ink set further includes a black ink, a cyan ink, a pale cyan ink, and a yellow ink.

42. An ink set for ink-jet imaging, comprising:
(a) a black ink including a first organic solvent system, said first organic solvent system including a first organic solvent and a second organic solvent;
(b) a cyan ink including a second organic solvent system, said second organic solvent system including the first organic solvent and a third organic solvent;
(c) a magenta ink including a third organic solvent system, said third organic solvent system including the first organic solvent and the third organic solvent;
(d) a yellow ink including a fourth organic solvent system, said fourth organic solvent system including the second organic solvent and a fourth organic solvent;
(e) a pale cyan ink and a pale magenta ink, each including at least one of the first organic solvent and the third organic solvent,
wherein the black ink does not include at least one of the third organic solvent and the fourth organic solvent, at least one of the cyan ink and the magenta ink does not include at least one of the second organic solvent and the fourth organic solvent, the yellow ink does not include at least one of the first organic solvent and the third organic solvent and at least one of the pale cyan ink and the pale magenta ink does not include at least one of the second organic solvent and the fourth organic solvent.

43. An ink set as in claim 42, wherein the solvent system of the yellow ink is different than the solvent system of the cyan ink or the magenta ink.

44. An ink set as in claim 42, wherein the solvent system of the black ink is different than the solvent system of the cyan ink, the magenta ink, or the yellow ink.

45. An ink set as in claim 42, wherein the cyan ink and the pale cyan ink include a first cyan dye and a second cyan dye, respectively, each having the same general chemical formula:

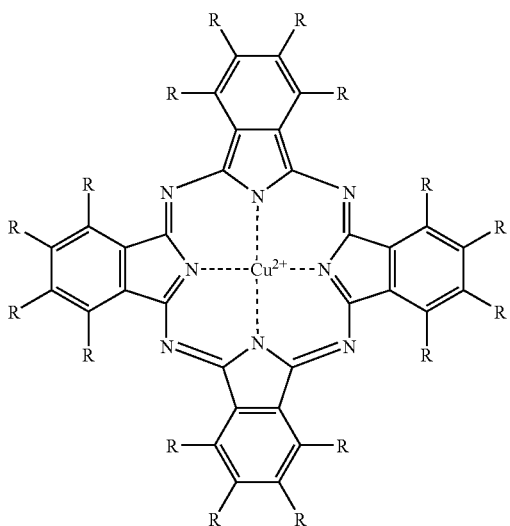

wherein each R group is independently selected from the group consisting of H, SO$_3$H, SO$_2$NH$_2$, and SO$_2$NH-alkyl-OH, with the proviso that an average of from 2 to 6 R groups are other than H, said first cyan dye having an average of 0.25 to less than 1.5 of the SO$_2$NH-alkyl-OH groups, and said second cyan dye having an average of 1.5 to 3 of SO$_2$NH-alkyl-OH groups.

46. An ink set as in claim 42, wherein the pale magenta ink includes a Ni$^{2+}$ complex of a magenta dye having the structure:

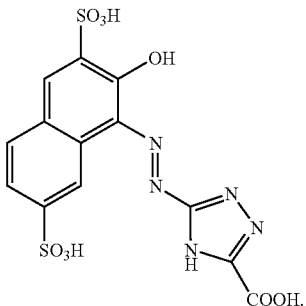

47. An ink set for ink-jet imaging, comprising:
(a) a black ink including a first organic solvent system, said first organic solvent system including a first organic solvent and a second organic solvent;
(b) a cyan ink including a second organic solvent system, said second organic solvent system including the first organic solvent and a third organic solvent;
(c) a magenta ink including a third organic solvent system, said third organic solvent system including the first organic solvent and the third organic solvent; and
(d) a yellow ink including a fourth organic solvent system, said fourth organic solvent system including the second organic solvent and a fourth organic solvent,
wherein at least two of the organic solvent systems are different, and wherein the third organic solvent is 2-methyl-1,3-propanediol, and is present in at least one of the cyan ink and the magenta ink at an amount from 5 wt % to 9.8 wt %.

48. An ink set as in claim 47, wherein the solvent system of the yellow ink is different than the solvent system of the cyan ink or the magenta ink.

49. An ink set as in claim 47, wherein the solvent system of the black ink is different than the solvent system of the cyan ink, the magenta ink, or the yellow ink.

50. An ink set for ink-jet imaging, comprising:
(a) a black ink including a first organic solvent system, said first organic solvent system including a first organic solvent and a second organic solvent;
(b) a cyan ink including a second organic solvent system, said second organic solvent system including the first organic solvent and a third organic solvent;
(c) a magenta ink including a third organic solvent system, said third organic solvent system including the first organic solvent and the third organic solvent; and
(d) a yellow ink including a fourth organic solvent system, said fourth organic solvent system including the second organic solvent and a fourth organic solvent,
wherein at least two of the organic solvent systems are different, wherein the fourth organic solvent is selected from the group consisting of tetraethylene glycol, ethylhydroxypropanediol, and mixtures thereof, and wherein one or both of the tetraethylene glycol and the ethylhydroxypropanediol are individually present in the yellow ink at from 3 wt % to 9 wt %.

51. An ink set as in claim 50, wherein the solvent system of the yellow ink is different than the solvent system of the cyan ink or the magenta ink.

52. An ink set as in claim 50, wherein the solvent system of the black ink is different than the solvent system of the cyan ink, the magenta ink, or the yellow ink.

53. An ink set as in claim 50, wherein both the tetraethylene glycol and the ethylhydroxypropanediol are present in the yellow ink.

54. An ink set for ink-jet imaging, comprising:
(a) a black ink including a first organic solvent system, said first organic solvent system including a first organic solvent and a second organic solvent;
(b) a cyan ink including a second organic solvent system, said second organic solvent system including the first organic solvent and a third organic solvent;
(c) a magenta ink including a third organic solvent sys- tem, said third organic solvent system including the first organic solvent and the third organic solvent; and
(d) a yellow ink including a fourth organic solvent system, said fourth organic solvent system including the second organic solvent and a fourth organic solvent,
wherein at least two of the organic solvent systems are different, and wherein the black ink includes a black dye having the structure:

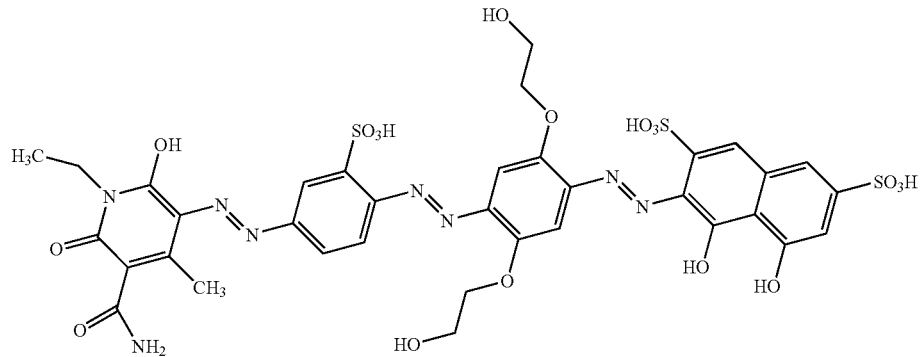

or, the magenta ink includes a Ni$^{2+}$ complex of a magenta dye having the structure:

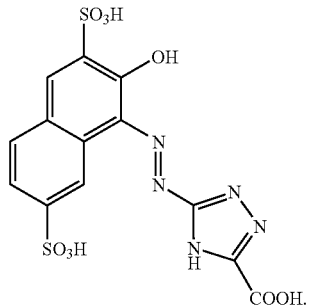

or, the yellow ink includes a yellow dye having the structure:

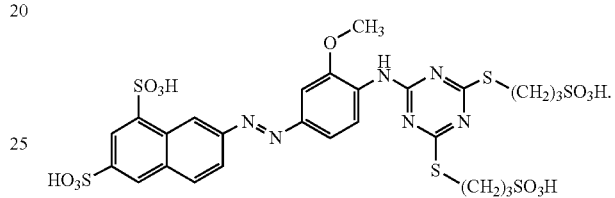

55. An ink set as in claim 54, wherein the solvent system of the yellow ink is different than the solvent system of the cyan ink or the magenta ink.

56. An ink set as in claim 54, wherein the solvent system of the black ink is different than the solvent system of the cyan ink, the magenta ink, or the yellow ink.

57. An ink set as in claim 54, wherein the magenta ink also includes a non-metallized dye.

* * * * *

UNITED STATES PATENT AND TRADEMARK OFFICE
CERTIFICATE OF CORRECTION

| | | |
|---|---|---|
| PATENT NO. | : 7,264,662 B2 | Page 1 of 1 |
| APPLICATION NO. | : 11/076167 | |
| DATED | : September 4, 2007 | |
| INVENTOR(S) | : Tye Dodge et al. | |

It is certified that error appears in the above-identified patent and that said Letters Patent is hereby corrected as shown below:

In column 18, line 45, in Claim 17, after "COOH" insert -- . --.

In column 19, line 19, in Claim 20, above "(b)" delete "and".

In column 19, line 39, in Claim 20, delete "R:" and insert -- R --, therefor.

In column 20, line 36, in Claim 21, delete "Formula II" and insert -- Formula III --, therefor.

In column 25, line 35, in Claim 54, after "COOH" delete ".".

Signed and Sealed this

Eighteenth Day of May, 2010

David J. Kappos
*Director of the United States Patent and Trademark Office*